(12) United States Patent
Falkenberg

(10) Patent No.: US 7,106,804 B2
(45) Date of Patent: Sep. 12, 2006

(54) METHOD OF AND SYSTEM FOR MODULATING AND DEMODULATING A COMMUNICATION SIGNAL USING DIFFERENTIAL QUADRATURE PHASE SHIFT KEYING (DQPSK)

(75) Inventor: Andreas Falkenberg, Escondido, CA (US)

(73) Assignee: Siemens Communications, Inc., Boca Raton, FL (US)

(*) Notice: Subject to any disclaimer, the term of this patent is extended or adjusted under 35 U.S.C. 154(b) by 663 days.

(21) Appl. No.: 09/929,714

(22) Filed: Aug. 13, 2001

(65) Prior Publication Data
US 2003/0072383 A1   Apr. 17, 2003

(51) Int. Cl.
*H04L 27/10* (2006.01)
(52) U.S. Cl. ........................... 375/283; 375/330
(58) Field of Classification Search ............... None
See application file for complete search history.

(56) References Cited

U.S. PATENT DOCUMENTS 5,313,493 A * 5/1994 Dutta .................... 375/283
5,355,092 A * 10/1994 Kosaka et al. .......... 329/304
5,369,378 A * 11/1994 Kosaka et al. .......... 332/104
5,745,527 A * 4/1998 Kelton et al. ........... 375/308
2001/0031024 A1* 10/2001 Petersen et al. ......... 375/335

OTHER PUBLICATIONS

Cameron Kelly Coursey, "Layer 1: The Digital PCS Physical Layer," Understanding Digital PCS The TDMA Standard, Artech House, Norwood, MA, 1999, pp. 50-55.
"Digital Modulation and Mobile Radio" Refresher topic from Rohde & Schwarz http://www.rsd.de pp. 1-19 printed Dec. 21, 2005.

* cited by examiner

Primary Examiner—Temesghen Ghebretinsae
Assistant Examiner—Juan Alberto Torres

(57) ABSTRACT

A system for and method of modulating and demodulating a communication signal using differential quadrature phase shift keying (DQPSK) can include, upon receiving an inbound communication signal, demodulating the inbound communication signal by obtaining Pi/4 differential quadrature phase shift keying (DQPSK) symbols, translating the Pi/4 DQPSK symbols into quadrature phase shift keying (QPSK) symbols, and mapping the QPSK symbols to a pair of bits. Upon initiating an outbound communication signal, the system and method can include modulating the outbound communication signal by obtaining communication bits indicative of the outbound communication signal, translating the communication bits to three communication bits, and mapping the translated bits to DQPSK symbols.

9 Claims, 3 Drawing Sheets

METHOD OF AND SYSTEM FOR MODULATING AND DEMODULATING A COMMUNICATION SIGNAL USING DIFFERENTIAL QUADRATURE PHASE SHIFT KEYING (DQPSK)

COPYRIGHTABLE MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present invention relates generally to telecommunication technologies. More particularly, an exemplary embodiment of the present invention relates to a method of modulating and demodulating a communication signal using differential quadrature phase shift keying (DQPSK).

In general, modulation is the process of impinging information (e.g., voice, data, or image) on a carrier signal and demodulation is the recovery of that information from the carrier at the distant end near a destination user. The equipment that performs the necessary conversion of a communication signal is typically called a modem, an acronym for modulator-demodulator. A modem modulates and demodulates a carrier signal with digital data signals. One type of modulation is phase modulation, which corresponds in digital terminology to phase shift keying (PSK).

One form of PSK is binary PSK. In binary PSK, there are two phases separated from each other by 180° phase difference. The demodulator is based on a synchronous detector using a reference signal of known phase. This known signal operates at the same frequency of the incoming signal carrier and is arranged to be in phase with one of the binary signals.

Digital personal communication service (PCS) is a popular name for a cellular standard for Time Division Multiple Access (TDMA). The actual Digital PCS standard is known as TIA/EIA-136 and was developed by the Telecommunications Industry Association (TIA). The modulation format of the TIA/EIA-136 digital control channel and digital traffic channel is Pi/4 shifted, differentially encoded quadrature phase shift keying (Pi/4 DQPSK).

In general, a differential quadrature phase shift keying (DQPSK) modulator operates as follows. First, the modulator receives binary data and converts it to a parallel stream. Then, the parallel streams are differentially encoded into two bit symbols using a symbol rate of, for example, 24.3 k symbols/second. The resulting two encoded data sequences are passed through square-root raised cosine filters for pulse shaping, and then used to quadrature modulate a carrier. The differential encoding of the data is carried out as differential phase encoding according to the rules shown in Table 1 below.

TABLE 1

| X | Y | Theta |
|---|---|---|
| 0 | 0 | Pi/4 |
| 0 | 1 | 3 Pi/4 |
| 1 | 0 | −Pi/4 |
| 1 | 1 | −3 Pi/4 |

This encoding allows for differential detection of the data at the receiver and limits the phase changes to minimize the linearity requirements of power amplifiers in the transmit chain. As such, the differential phase encoder maps two consecutive bits, X and Y, to the Real and Imaginary component of the output signal. The mapping of X and Y can be shown as: real(S)=2*X−1 and imag(S)=2*Y−1.

Accordingly, conventional Pi/4 DQPSK modulation can be described using the formula:

$$S(t) = e^{(j*Theta)} * e^{(j*t*Pi/4)}$$

where Theta is defined according to the encoding rules in Table 1 above. Every time step, new data (X, Y) is used to calculate the output Symbol.

As such, the conventional modulation scheme requires a complex multiplication, involving real and imaginary parts. In practice, such a complex multiplication is computationally challenging, requiring components which are expensive and complex to carry out the mathematics.

Thus, there is a need for modulating and demodulating a communication signal using an improved differential quadrature phase shift keying (DQPSK) method. Further, there is a need for more simple technique for translating Pi/4 DQPSK symbols into QPSK symbols. Yet further, there is a need for an optimized and resource saving DQPSK method.

SUMMARY OF THE INVENTION

The present invention relates to techniques for modulation and demodulation of communication signals using differential quadrature phase shift keying (DQPSK). For modulation, the techniques can translate communication bits using an XOR operation. This avoids the need to perform complicated complex multiplication. For demodulation, the techniques can translate DQPSK symbols to QPSK symbols by multiplying an actual symbol with the conjugate complex of the predecessor of the symbol. As such, the phase of the first symbol does not need to be known.

An exemplary embodiment of the invention is related to a method of modulating or demodulating a communication signal using differential quadrature phase shift keying (DQPSK). This method can include, upon receiving an inbound communication signal, demodulating the inbound communication signal by obtaining Pi/4 differential quadrature phase shift keying (DQPSK) symbols, translating the Pi/4 DQPSK symbols into quadrature phase shift keying (QPSK) symbols, and mapping the QPSK symbols to a pair of bits. Upon initiating an outbound communication signal, the system and method can include modulating the outbound communication signal by obtaining communication bits indicative of the outbound communication signal, translating the communication bits to three communication bits, and mapping the translated bits to DQPSK symbols.

Another exemplary embodiment of the invention is related to a Pi/4 differential quadrature phase shift keying (DQPSK) modem. This modem can include a processing unit and a storage device coupled to the processing unit and having stored there information for configuring the processing unit. The processing unit can be configured to obtain Pi/4 differential quadrature phase shift keying (DQPSK) symbols, translate the Pi/4 DQPSK symbols into quadrature phase shift keying (QPSK) symbols, map the QPSK symbols to a pair of bits, obtain communication bits indicative of the outbound communication signal, translate the communication bits to three communication bits, and map the translated bits to DQPSK symbols.

Another exemplary embodiment of the invention is related to a system which modulates or demodulates a communication signal using differential quadrature phase shift keying (DQPSK). This system can include means for obtaining Pi/4 differential quadrature phase shift keying (DQPSK) symbols, means for translating the Pi/4 DQPSK symbols into quadrature phase shift keying (QPSK) symbols, means for mapping the QPSK symbols to a pair of bits, means for obtaining communication bits indicative of the outbound communication signal, means for translating the communication bits to three communication bits, and means for mapping the translated bits to DQPSK symbols.

Another exemplary embodiment of the invention is a method of modulation using differential quadrature phase shift keying (DQPSK). This method can include obtaining two communication bits indicative of the outbound communication signal, translating the two communication bits to three communication bits, and mapping the translated bits to DQPSK symbols.

Another exemplary embodiment of the invention is a method of demodulation using differential quadrature phase shift keying (DQPSK). This method can include obtaining Pi/4 differential quadrature phase shift keying (DQPSK) symbols, translating the Pi/4 DQPSK symbols into quadrature phase shift keying (QPSK) symbols, and mapping the QPSK symbols to a pair of bits.

Other principle features and advantages of the invention will become apparent to those skilled in the art upon review of the following drawings, the detailed description, and the appended claims.

BRIEF DESCRIPTION OF THE DRAWINGS

The exemplary embodiments will hereafter be described with reference to the accompanying drawings, wherein like numerals denote like elements, and.

DETAILED DESCRIPTION OF THE EXEMPLARY EMBODIMENTS

A system for and method of modulating and demodulating a communication signal using differential quadrature phase shift keying (DQPSK) are described. In the following description, for purposes of explanation, numerous specific details are set forth in order to provide a thorough understanding of the present invention. It will be evident, however, to one skilled in the art that the exemplary embodiments may be practiced without these specific details. In other instances, structures and devices are shown in block diagram form in order to facilitate description of the exemplary embodiments.

In one embodiment, a computer system can be used which has a processing unit, such as, a central processing unit (CPU) that executes sequences of instructions contained in a memory. More specifically, execution of the sequences of instructions causes the CPU to perform steps, which are described below. The instructions may be loaded into a random access memory (RAM) for execution by the CPU from a read-only memory (ROM), a mass storage device, or some other persistent storage. In other embodiments, hard-wired circuitry may be used in place of, or in combination with, software instructions to implement the functions described. Thus, the embodiments described herein are not limited to any specific combination of hardware circuitry and software, nor to any particular source for the instructions executed by the computer system.

Figure 1:
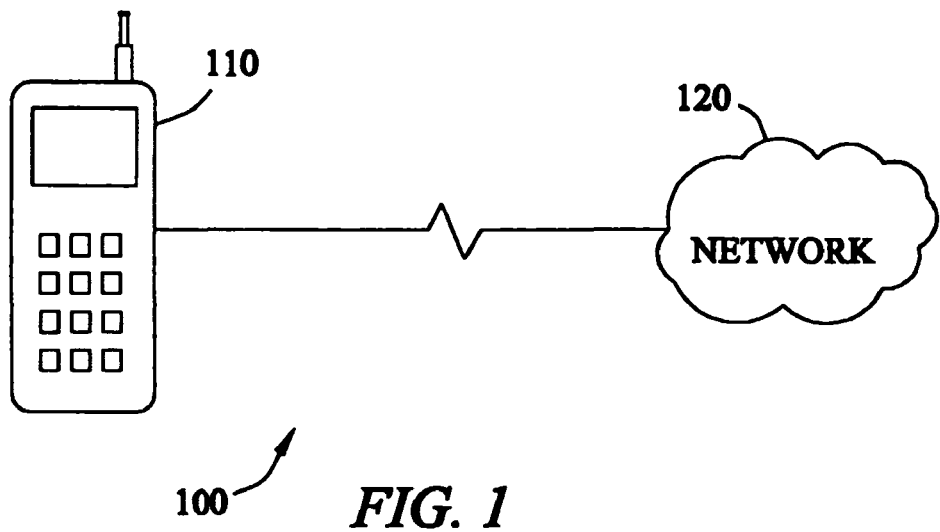
FIG. 1 is a diagram of a communication system in accordance with an exemplary embodiment.

FIG. 1 illustrates a communication system 100 in which a communication device 110 communicates with a network 120. Communication device 110 includes a modem or modem circuitry to modulate and demodulate communication signals communicated to and from network 120. Such modem circuitry can be hardwired or programmed into a processing unit. In an exemplary embodiment, communication device 110 utilized phase shift keying (PSK) modulation and demodulation techniques, as described below with reference to FIGS. 2–5.

Figure 2:
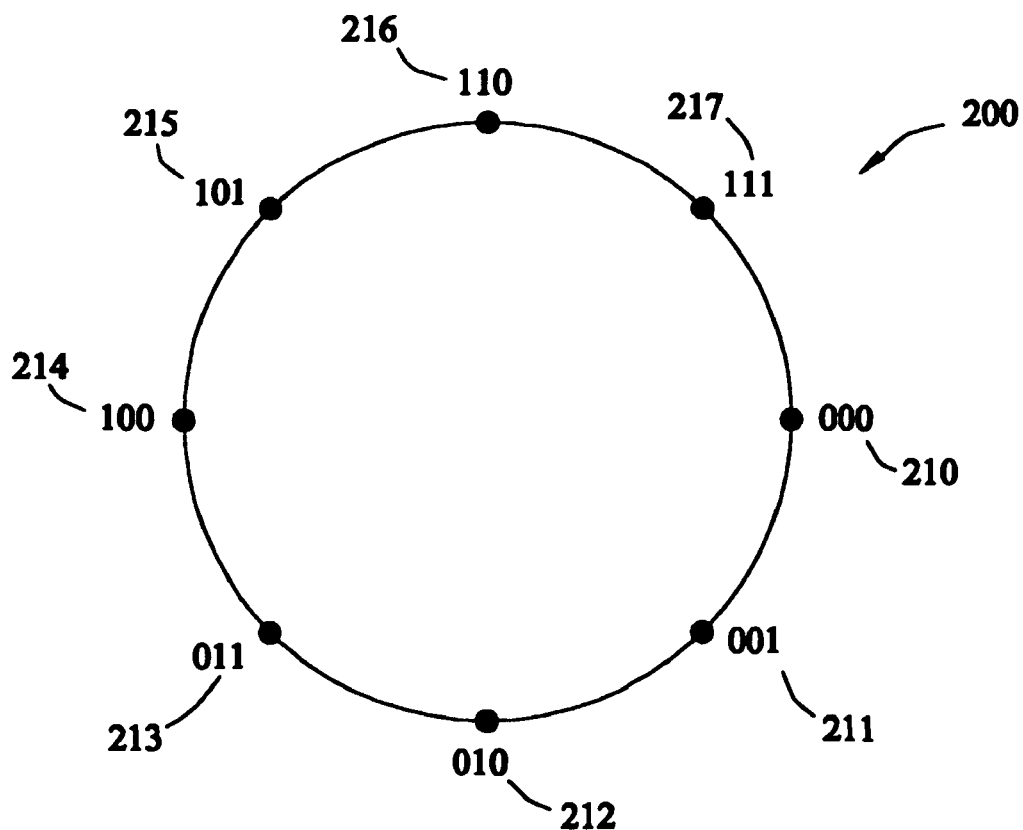
FIG. 2 is a phase constellation map in a method of modulation in accordance with an exemplary embodiment.

FIG. 2 illustrates a phase constellation map 200 in which symbols 210–217 are representative of phase locations of communication symbols in an exemplary Pi/4 DQPSK modulation or demodulation method. Symbols 210–217 are separated by 45 degrees or Pi/4. In an exemplary embodiment, symbols 210–217 can be identified using a binary numbering system of 000, 001, 010, 011, 100, 101, 110, and 111.

As explained above, modulation and demodulation involving phase shifting keying (PSK) involves shifting phases, or, in terms of phase constellation map 200, moving around symbols 210–217 on map 200. To move about phase constellation map 200, an angle change needs to be provided. Table 2 below provides an exemplary angle change, Theta, corresponding to various data points for X and Y. Using Table 2, if X, Y=11 is received, an angle change of −Pi/4 (or −45°) is indicated. Similarly, if X, Y=10 is received, an angle change of −3 Pi/4 (or −135°) is indicated.

TABLE 2

| X | Y | Theta |
|---|---|-------|
| 0 | 0 | Pi/4 |
| 0 | 1 | 3 Pi/4 |
| 1 | 0 | −3 Pi/4 |
| 1 | 1 | −Pi/4 |

The Pi/4 DQPSK modulation can be described by the following formula:

$$S_2(t_n) = (XY1)_2 + S_2(t_{n-1})$$

where (XY1) is the binary number set together of the two bits X and Y. The Symbol $S_2(t_n)$ is the binary representation of a symbol at time $(t_n)$ and the previous symbol is represented by $S_2(t_{n-1})$. Using a lookup table, binary symbols $S_2(t_n)$ are mapped to the real and imaginary part of the resulting symbol. Table 3 illustrates an exemplary lookup table.

TABLE 3

| Bit Combination | Real | Imaginary |
|-----------------|------|-----------|
| 000 | 0 | 1 |
| 001 | −0.707 | 0.707 |
| 010 | −1 | 0 |
| 011 | −0.707 | −0.707 |
| 100 | 0 | −1 |

TABLE 3-continued

| Bit Combination | Real | Imaginary |
|---|---|---|
| 101 | 0.707 | −0.707 |
| 110 | 1 | 0 |
| 111 | 0.707 | 0.707 |

Figure 3:
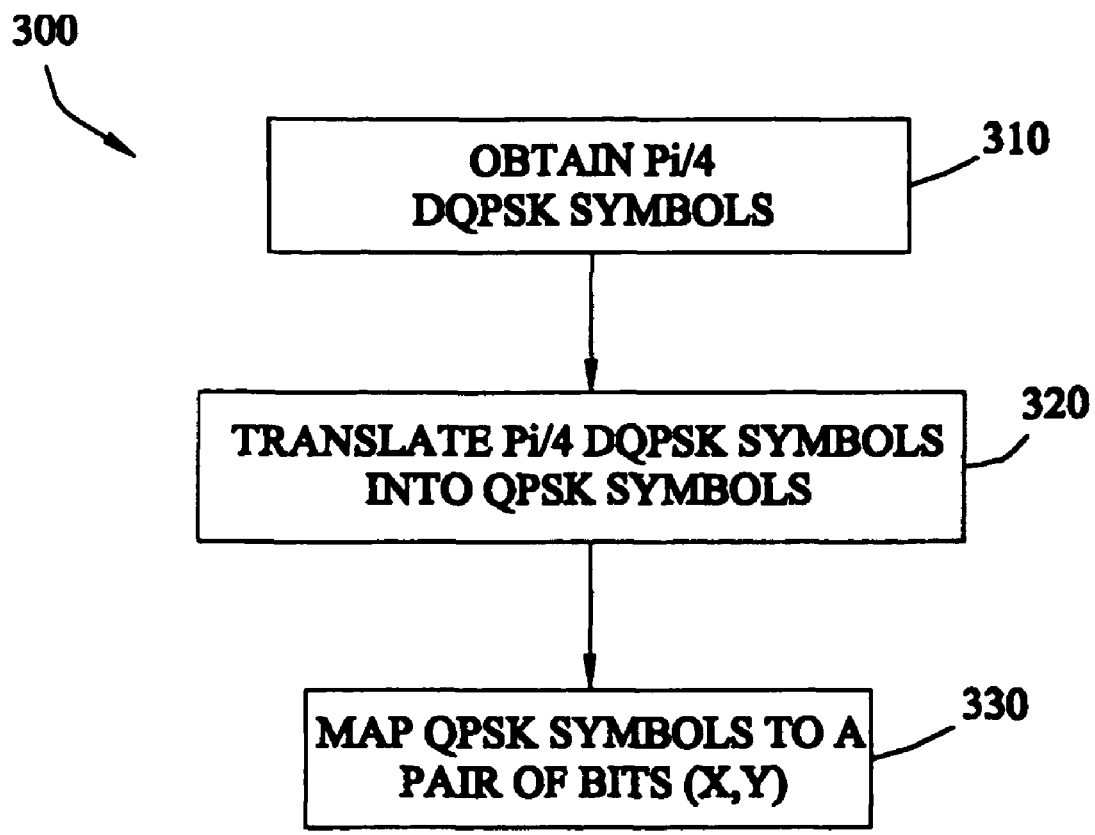
FIG. 3 is a flow diagram illustrating steps in a method of demodulation in accordance with an exemplary embodiment.

FIG. 3 illustrates a flow diagram 300 including steps in an exemplary method of demodulating a communication signal using differential quadrature phase shift keying (DQPSK). In an exemplary embodiment, the method includes a step 310 to obtain Pi/4 DQPSK symbols. Pi/4 DQPSK symbols can be obtained by any RF receiver or any receiver used in communication (e.g., a fiber optics receiver).

After step 310, a step 320 can be performed to translate the Pi/4 DQPSK symbols obtained in step 310 into quadrature phase shift keying (QPSK) symbols. In an exemplary embodiment, the Pi/4 DQPSK symbols can be translated by using a relationship between a DQPSK symbol at time t, S(t), and a QPSK symbol at time t, $S_{QPSK}(t)$. Symbol $S_{QPSK}(t)$ represents the same pair of bits as S(t) if QPSK Modulation were used. If S(t)=real(S(t))+j*imag(S(t))=|S(t)|*e^(j*theta(t)), where theta(t) describes the phase of the t'th Symbol, |S(t)| describes the radius of the t'th Symbol. Mathematically, the relationship between S(t) and $S_{QPSK}(t)$ can be represented:

$$S_{QPSK}(t)=|S(t)|*e\hat{\,}(j*theta(t))*|S(t-1)|*e\hat{\,}(-j*theta(t-1))$$

The actual Symbol—S(t)—is multiplied with the conjugate complex of its predecessor. This means that the phase of the predecessor is subtracted from the phase of the actual Symbol. This leads to the desired result, which is a QPSK Symbol.

In an exemplary embodiment, for implementation purposes, an I/Q representation of the complex Symbols is used, which means that the following formula is implemented:

$$S_{QPSK}(t)=(real(S(t))+imag(S(t)))*(real(S(t-1))-imag(S(t-1)))$$

Advantageously, in a software implementation, the demodulator requires only a handful of commands in assembly or C programming languages to be implemented. Further, the method makes use of the advantages of a Pi/4 DQPSK Signal as well as the advantages of QPSK Signals. If the phase of the first Symbol is not known, the method works for all other Symbols, since only the phase of the predecessor has to be known. In conventional methods, the actual phase rotation has to be known.

After step 320, a step 330 can be performed to map the QPSK symbols obtained in step 320 to a pair of bits. In an exemplary embodiment, a lookup table is used to map the QPSK symbols to a pair of bits. Table 4 provides an exemplary lookup table used in step 320.

TABLE 4

| QPSK Symbol Input | Two Bits Output |
|---|---|
| Pi/4 | 00 |
| 3 Pi/4 | 01 |
| −3 Pi/4 | 10 |
| −Pi/4 | 11 |

The following software code for an ADI 2181 DSP platform provides an exemplary software demodulation embodiment. The software assumes that the I part of the actual symbol is provided in the register AX0 and the Q part is provided in AY0. Further, the I part of the predecessor symbol is located at address I_old and the Q part is located at Q_old. The result symbol is put in I_out and Q_out.

© 2001 Siemens Information and Communication Mobile LLC, All rights reserved.

```
Demodulator_setIQ:
    MX0 = AX0;              /* get I */
    MY0 = DM(I_old);        /* get last I */
    MR = MX0 * MY0 (SS);
    MX1 = AY0;              /* get Q */
    MY1 = DM(Q_old);        /* get last Q */
    MR = MR + MX1 * MY1 (SS);   /* calculate real result */
    DM(I_out) = MR1;
    MR = MX1 * MY0 (SS);    /* calculate imag result */
    MR = MR − MX0 * MY1 (SS);
    DM(Q_out) = MR1;
    DM(I_old) = AX0;        /* old values on next input */
    DM(Q_old) = AY0;
    rts;
```

Figure 4:
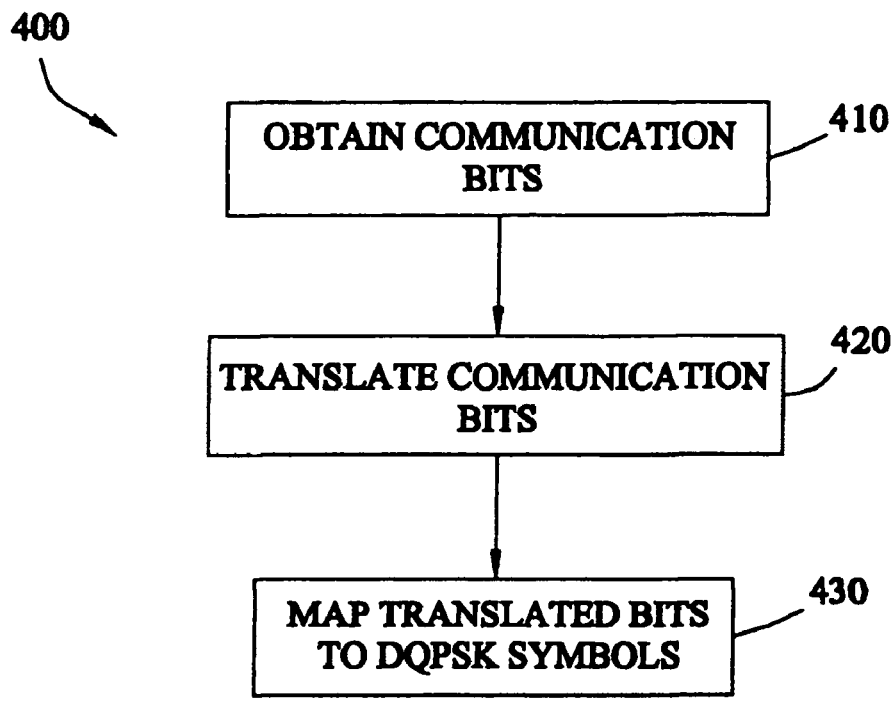
FIG. 4 is a flow diagram illustrating steps in a method of modulation in accordance with an exemplary embodiment.

FIG. 4 illustrates a flow diagram 400 including steps in an exemplary method of modulating a communication signal using differential quadrature phase shift keying (DQPSK). In an exemplary embodiment, the method includes a step 410 to obtain two communication bits as inputs. Such communication bits can be provided by a software program running in a processing unit. Such a processing unit may be included in a modem in any of a variety of configurations.

After step 410, a step 420 can be performed to translate the two communication bits obtained in step 410 into three bits. In alternative embodiments, different numbers of communication bits may be used. In an exemplary embodiment, the two communication bits are translated to three bits using a XOR operation and an adder (for the additional bit). Such a translation maps the X, Y relationship provided in Table 1 with the X, Y relationship provided in Table 2. If X and Y are bits used as X and Y in Table 2 and X' and Y' are bits used in Table 1 as X and Y, the relationship between X, Y and X', Y' can be represented as:

X=X'

Y'=X xor Y.

After step 420, a step 430 can be performed to map the communication bits obtained in step 420 to DQPSK symbols. In an exemplary embodiment, a lookup table (such as the lookup table shown in Table 3 described with reference to FIG. 2) is used to map the bits to the DQPSK symbols.

Figure 5:
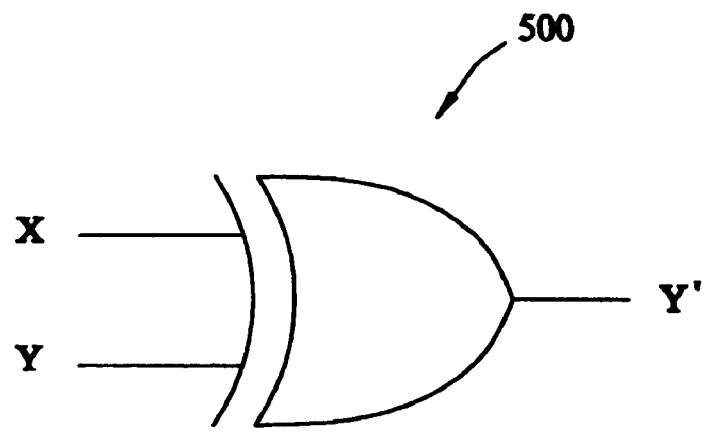
FIG. 5 is a schematic representation of an mapping mechanism in accordance with an exemplary embodiment.

FIG. 5 illustrates an XOR gate 500 configured for mapping modulation schemes as described with reference to FIG. 4. XOR gate 500 includes X and Y inputs. Advantageously, applying XOR gate 500 helps to simplify the computations necessary in modulation using differential quadrature phase shift keying (DQPSK). As such, circuitry necessary to implement is easier and cheaper to manufacture.

By way of an example of implementation, the following software code for an ADI 2181 DSP platform provides an exemplary software modulation embodiment.

© 2001 Siemens Information and Communication Mobile LLC, All rights reserved.

```
/* The lowest Bits of the register AX0 contain the two bits to send. */
Modulator_setXY; /* The Bits X and Y are the lowest two Bits of
AX0 */
/* First the adaption of the common method to the described method
takes place */
AR = AX0;
AF = TSTBIT 1 of AX0;       /* Test X */
IF NE AR = AX0 XOR 1;       /* If X = 1 than Y = X XOR Y; */
/* The Main Algorithm */
SR = LSHIFT AR BY 1 (LO);   /* XY are the rightmost bits of AR */
AR = SR0 + 1;               /* AR = XY1 */
AY0 = DM(IQ_Position);      /*AY0 contains the old position on the
                               circle (lower three bits) */
AR = AR + AY0;              /* The addition itself */
AY1 = 7;
AR = AR AND AY1;            /* only lower three bits are required
                               since it is a modulo 8 addition */
DM(IQ_Position) = AR;       /* the new Position of the Symbol on
                               the circle is in IQ_Position */
rts;
/* To send out the right Symbol, the IQ-Position has to be translated
using a lookup table to the appropriate real and imaginary value of the
output symbol. */
Modulator_getIQ:            /* The purpose is to read the Table
                               Entries according to the IQ_Pointer */
                            /* Result I = AX0 and Q = AY0 */
M0 = 0;
AX0 = ˆTableI;              /* Start of table containing real
                               values */
AX1 = ˆTableQ;              /* Start of table containing imaginary
                               values */
AY0 = DM(IQ_Position);      /* Get the three bits of IQ_Position */
AR = AX0 + AY0;             /* Calculate the Address of the Table
                               entry */
I0 = AR;
AR = AX1 + AY0;             /* Calculate the same for the second
                               Table entry */
I1 = AR;
AX0 = DM(I0,M0);            /* Real Value is in AX0 and Imaginary
                               Value is in AY0 */
AY0 = DM(I1,M0);
rts;
```

In summary, one of the principle advantages of the method and system described with respect to FIGS. 1–5 include lower resource consumption, either in hardware or software, leading to faster circuits with less power consumption.

While the exemplary embodiments illustrated in the figures and described above are presently preferred, it should be understood that these embodiments are offered by way of example only. Other embodiments may include, for example, different techniques for translating Pi/4 DQPSK signals to QPSK signals. The invention is not limited to a particular embodiment, but extends to various modifications, combinations, and permutations that nevertheless fall within the scope and spirit of the appended claims.

What is claimed is:

1. A Pi/4 differential quadrature phase shift keying (DQPSK) modem, the modem comprising:
   a processing unit; and
   a storage device coupled to the processing unit and having stored there information for configuring the processing unit to:
      obtain Pi/4 differential quadrature phase shift keying (DQPSK) symbols;
      translate the Pi/4 DQPSK symbols into quadrature phase shift keying (QPSK) symbols utilizing the formula $$S_{QPSK}(t)=(real(S(t))+imag(S(t))*(real(S(t-1))-imag(S(t-1))),$$

where S(t) is a DQPSK symbol at time t, and $S_{QPSK}(t)$ is a QPSK symbol at time t;
   map the QPSK symbols to a pair of bits;
   obtain communication bits indicative of the outbound communication signal;
   translate the communication bits to three communication bits; and
   map the translated bits to DQPSK symbols.

2. The modem of claim 1, wherein the translation of the communication bits to three communication bits comprises performing an XOR operation.

3. The modem of claim 1, wherein the mapping of QPSK symbols to a pair of bits performed by the processing unit comprises utilizing a lookup table to map the QPSK symbols to a pair of bits.

4. The modem of claim 1, wherein the storage device comprises look up tables having the following values stored therein:

| QPSK Symbol Input | Two Bits Output |
|---|---|
| Pi/4 | 00 |
| 3 Pi/4 | 01 |
| −3 Pi/4 | 10 |
| −Pi/4 | 11 | and

| Bit Combination | Real | Imaginary |
|---|---|---|
| 000 | 0 | 1 |
| 001 | −0.707 | 0.707 |
| 010 | −1 | 0 |
| 011 | −0.707 | −0.707 |
| 100 | 0 | −1 |
| 101 | 0.707 | −0.707 |
| 110 | 1 | 0 |
| 111 | 0.707 | 0.707. |

5. A system which modulates or demodulates a communication signal using differential quadrature phase shift keying (DQPSK), the system comprising:
   means for obtaining Pi/4 differential quadrature phase shift keying (DQPSK) symbols;
   means for translating the Pi/4 DQPSK symbols into quadrature phase shift keying (QPSK) symbols utilizing the formula $$S_{QPSK}(t)=(real(S(t))+imag(S(t))*(real(S(t-1))-imag(S(t-1))),$$

where S(t) is a DQPSK symbol at time t, and $S_{QPSK}(t)$ is a QPSK symbol at time t;
   means for mapping the QPSK symbols to a pair of bits;
   means for obtaining communication bits indicative of the outbound communication signal;
   means for translating the communication bits to three communication bits; and
   means for mapping the translated bits to DQPSK symbols.

6. The system of claim 5, wherein the means for translating the communication bits to three communication bits does not involve a complex multiplication operation.

7. The system of claim 5, wherein the means for translating the communication bits to three communication bits comprises means for performing an XOR operation.

8. The system of claim 5, wherein a phase of a first symbol is not known and a phase of a predecessor symbol is known.

9. The system of claim 5, wherein the means for mapping the QPSK symbols to a pair of bits comprises means for utilizing a lookup table to map the QPSK symbols to a pair of bits.

* * * * *